United States Patent [19]

Tsang et al.

[11] Patent Number: 5,749,952
[45] Date of Patent: May 12, 1998

[54] PREPARATION OF MICROEMULSION AND MICELLAR COLOR INKS FROM MODIFIED WATER-SOLUBLE COLOR CHROMAPHORES FOR THERMAL INK-JET PRINTING

[75] Inventors: Joseph W. Tsang; John R. Moffatt, both of Corvallis, Oreg.

[73] Assignee: Hewlett-Packard Company, Palo Alto, Calif.

[21] Appl. No.: 742,097

[22] Filed: Oct. 31, 1996

[51] Int. Cl.$^6$ ................................................ C09D 11/00
[52] U.S. Cl. ........................... 106/31.64; 106/31.69; 106/31.82; 106/31.85; 106/31.86; 106/31.89
[58] Field of Search .................... 106/31.58, 31.86, 106/31.57, 31.85, 31.59, 31.89, 31.53, 31.82, 31.37, 31.69, 31.64

[56] References Cited

U.S. PATENT DOCUMENTS

| | | | |
|---|---|---|---|
| 5,133,803 | 7/1992 | Moffatt | 106/25 |
| 5,169,438 | 12/1992 | Matrick | 106/22 R |
| 5,531,816 | 7/1996 | Wickramanayake | 106/20 R |

FOREIGN PATENT DOCUMENTS

| | | | |
|---|---|---|---|
| WO 96/18695 | 6/1996 | WIPO | C09D 11/00 |
| WO 96/18696 | 6/1996 | WIPO | C09D 11/02 |

*Primary Examiner*—Deborah Jones

[57] ABSTRACT

The ink of the invention comprises a vehicle and a colorant, with the vehicle comprising a microemulsion containing at least one substantially water-insoluble organic oil, at least one organic cosolvent, and water and, optionally, at least one amphiphile and at least one high molecular weight colloid. The colorant is a water-insoluble chromaphore that has been chemically modified to be water-soluble by addition of functional groups that impart water solubility. These functional groups are added to the surface of the chromaphore particles, resulting in water-soluble colorant particles. The inks described herein demonstrate high edge acuity, high optical density, fast drying times, reduced bleed, improved halo characteristics, high water fastness, and high smearfastness.

24 Claims, No Drawings

PREPARATION OF MICROEMULSION AND MICELLAR COLOR INKS FROM MODIFIED WATER-SOLUBLE COLOR CHROMAPHORES FOR THERMAL INK-JET PRINTING

TECHNICAL FIELD

The present invention relates to ink compositions for thermal ink-jet printing in a printer such as Hewlett-Packard's DeskJet® printer.

BACKGROUND ART

Thermal ink-jet printers offer a low cost, high quality, and comparatively noise-free option to other types of printers commonly used with computers. Such printers employ a resistor element in a chamber provided with an egress for ink that entered from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected through a conductive trace to a microprocessor where current-carrying signals cause one or more selected elements to heat up. The heating creates a bubble of ink in the chamber which is expelled through the nozzle toward the print medium. In this way, firing a plurality of such resistor elements in a particular order in a given primitive forms alphanumeric characters, performs area-fills, and provides other print capabilities on the medium.

Ink-jet inks used in thermal ink-jet printing typically comprise a colorant and a vehicle, with the vehicle often containing water and other relatively low surface tension liquids.

The tight tolerances of the nozzles, typically 50 μm diameter, require that the ink not clog the nozzles. Further, repeated firings of the resistor elements, which must withstand about 10 million firings over the life of the ink cartridge, can result in fouling of the resistor element. Finally, the ink composition must be capable of interacting with the print medium, especially paper, to penetrate the paper without undue spreading, and the ink composition should be smear- and water-resistant on the paper.

Inks are known which possess one or more of the foregoing properties. However, few ink compositions are known that posses all of those properties, since an improvement in one property often results in the degradation of another. Thus, inks used commercially represent a compromise in an attempt to achieve an ink evidencing at least an adequate performance in each of the aforementioned properties.

Accordingly, investigations continue into developing ink formulations that have improved properties such as high edge acuity, high optical density, fast drying times, good waterfastness, and good smearfastness without sacrificing performance in other necessary properties.

DISCLOSURE OF INVENTION

In accordance with the invention, inks used in ink-jet printing are provided wherein the edge acuity, optical density, drying time, water-resistance, and smear-resistance of the inks are improved through the use of a microemulsion-based ink-jet ink that enhances print quality, reduces the halo-effect and controls bleed. The halo effect occurs when a black ink, which has a high surface tension, is printed immediately adjacent color ink, which has a lower surface tension. At the interface between the two inks, there is apparently a depletion of black optical density, resulting in the appearance of a "halo". The present invention alleviates the halo effect.

The ink-jet ink of the invention comprises:

(a) a vehicle comprising (1) about 0.1 to 50 wt % of at least one substantially water-insoluble organic oil, (2) 0 to about 50 wt % of at least one organic cosolvent, (3) 0 to about 40 wt % of at least one amphiphile, and (4) 0 to about 3 wt % of at least one high molecular weight colloid;

(b) about 0.5 to 20 wt % of at least one chemically-modified, water-soluble colorant; and (c) the balance water.

All the above components are present in the ink formulation as a microemulsion, which gives the ink formulation its improved properties.

Additionally, in further accordance with the invention, a method of ink-jet printing which uses the disclosed inks and exploits the inks' properties is provided.

Finally, a method of preparing the ink-jet ink of the present invention is provided, comprising combining the components to form a mixture and mechanically stirring or sonicating the mixture to form the microemulsion ink.

BEST MODES FOR CARRYING OUT THE INVENTION

By definition, a classical microemulsion consists of swelled micelles in solution. In the present invention, a microemulsion is defined as a stable, isotropic solution that consists of an oil (a substantially water-insoluble organic compound), an amphiphile/surfactant, an organic cosolvent, and water. Regardless of the identity of the micelles, they must be present at a high enough concentration so that the desired physical structure of the microemulsion will form. Traditionally, this minimum micellular concentration has been called the critical micelle concentration (cmc). If the concentration of micelles in solution is below the cmc, the microemulsion will not form. Without subscribing to any particular theory, it is speculated that the water-soluble chromophore or colorant is dissolved in the aqueous phase in these microemulsions.

The use of microemulsions improves waterfastness and smearfastness. Additionally, bleed of one ink into another is much more controllable and the halo-effect is reduced when the colorant is supplied in a microemulsion. When the microemulsion breaks up upon contact with the print media, the ability of the ink vehicle to continue to solubilize the colorant disappears. Therefore, the colorant is essentially a solid precipitated on the surface of the print media.

All concentrations herein are expressed in weight percentages, unless otherwise indicated. The purity of all components is that employed in normal commercial practice for ink-jet inks.

A typical formulation for an ink useful in the practice of the present invention includes an oil (about 0.1 to 50 wt %), a cosolvent (0 to about 50 wt %), a colorant (about 0.5 to 20 wt %), an amphiphile (0 to about 40 wt %), a high molecular weight colloid (0 to about 3 wt %), and water. However, the ink must at least include the oil, the colorant, the co-solvent, and water.

Any substantially water-insoluble organic solvent that is compatible with all the other components of the ink may be employed as an oil in the practice of the present invention. Classes of useful oils include, but are not limited to, glycol ethers, phenyl ethers, poly(glycol) ethers, alkyl ethers, aryl ethers, alkylaryl ethers, alkyl esters, aryl esters, poly(glycol) esters, alkyl phenyl polyethylene oxides, aliphatic polyethylene oxides (POEs, which are available as TERGITOLs and BRIJs from Union Carbide and ICI America, respectively), water-insoluble acetyleneic polyethylene oxide (insoluble SURFYNOLs, available from Air Products & Chemicals, Inc.), polyethylene oxide block copolymers (PLURONICS, available from BASF), POE esters, POE diesters, POE amines, POE amides, and dimethicone copolyols. The use of BRIJs, TRITONs, TERGITOLs, PLURONICs, and SURFYNOLs are more fully disclosed in U.S. Pat. No. 5,106,416, "Bleed Alleviation Using Zwitterionic Surfactants and Cationic Dyes."

As will be discussed below, many of these classes of oils encompass molecules that are useful as surfactants in the practice of this invention, as well. The main distinguishing feature between actual examples of molecules useful as oils and examples of molecules useful as surfactants is that the surfactant molecules typically have longer chain lengths and are more water soluble than the oils. Specific examples of substantially water-insoluble organic oils that are preferably employed in the practice of this invention include, but are not limited to, ethylene glycol phenyl ether (EPH) and propylene glycol phenyl ether (PPH). The most preferred oil is EPH.

The oil concentration may range from about 0.1 to 50 wt %, with 2.5 wt % being preferred. By "substantially water-insoluble" is meant that the solubility of the oil in water must be below about 3.7% (the maximum concentration of EPH in water).

The cosolvent may be used as a separate component or as a replacement for the amphiphile/surfactant. This means that in some embodiments of the invention the micelles may contain cosolvent molecules. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from 0 to about 50 wt %, with about 0.1 to 15 wt % being preferred.

For convenience, examples of surfactants are divided into two categories: (1) non-ionic and amphoteric and (2) ionic. The former class includes: TERGITOLs; TRITONs, which are alkyl phenyl polyethylene oxide surfactants available from Rohm & Haas Co.; BRIJs; PLURONICs; and the SURFYNOLs; POE esters; POE diesters; POE amines; protonated POE amines; POE amides; and dimethicone copolyols. Ionic surfactants such as substituted amine oxides are useful in the practice of this invention. U.S. Pat. No. 5,106,416, "Bleed Alleviation Using Zwitterionic Surfactants and Cationic Dyes" discloses more fully most of the surfactants listed above. The non-ionic amphiphiles/ surfactants are more preferred than the ionic surfactants. Specific examples of amphiphiles/surfactants that are preferably employed in the practice of this invention include, but are not limited to, iso-hexadecyl ethylene oxide 20, SURFYNOL CT-111, TERGITOL 15-S-7, and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octadecenyl)-N-amine oxide. The concentration of the amphiphiles/surfactants may range from 0 to about 40 wt %, with 2.5 wt % being preferred.

Colorants suitable for use in this invention include all chemically-modified, water-soluble pigments (black and color). The chemical modification imparts water-solubility to the pigment precursors which encompass all organic pigments. Under typical chemical processes, the resulting surfaces consist of carboxylate and/or sulfonate functionalities for anionic chromophores and ammonium or phosphonium functionalities for cationic chromophores. Depending on the process selected, the chromaphore can either be anionic or cationic in character. For example, acidic functionality such as sulfonic acid functionalization results from exhaustive sulfonation with fuming sulfuric acid, while carboxylic acid groups result from either chemical or catalytic oxidative reactions. Conversely, basic chromophores containing ammonium ions result from reductive amidation reactions.

The chemical modification approach differs from the use of amphiphilic polymers and like surfactant species, which have been traditionally used to solubilize water-insoluble colorants. In aqueous solutions, the chemically-modified chromophores possess excellent water solubility without the use of other solubilizing additives such as amphiphilic polymers and surfactants. Black inks prepared from these water-soluble chromophores provide printed media with black optical density commonly found in toners used in Hewlett-Packard's Laser-Jet® printers.

The chemical modification is a far less process-intensive procedure, and avoids the more common approach of ball milling the carbon black or color pigment in the presence of an amphiphilic polymer or surfactant.

These water-soluble black chromophores are commercially available from colorant vendors such as Cabot Corp. and Orient Chemical. Many pigments are useful in the practice of this invention. The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarche® 800, and Monarch® 700. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

For anionic chromophores, the counterions include all alkali metal ions and alkaline earth metal ions, as well as both substituted and unsubstituted ammonium ions. For cationic chromophores, suitable counterions include all halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions.

A preferred pigment is a functionalized graphite-like (carbon black) particle with mean diameter ranging from about 0.005 to 12 pm. Colorants of this type result from chemical reactions where solvent-accessible functional groups are derivatized to provide solubilizing groups that render the colorant soluble in water. This resulting macromolecular chromophore (MMC) is water-soluble, with its solubility being similar to that of well known and commercially used water-soluble acidic and basic dyes.

To improve optical density, between 0 and about 3 wt % of at least one high molecular weight colloid derived from natural or synthetic sources may optionally be added to the ink formulation. Addition of a high molecular weight colloid improves print quality. Examples of high molecular weight colloids employed in the practice of this invention include, but are not limited to, alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids which Control Bleed." The preferred high molecular weight colloids employed in the practice of this invention include, but are not limited to, low viscosity, Na alginate. The preferred concentration of the high molecular weight component colloid in the inks of this invention is about 0.25 wt %.

The preferred composition of ink consists of an oil, a surfactant, a cosolvent, and a modified pigment. The preferred oil is EPH or PPH present at less than 5 wt %. The surfactant is a BRIJ, PLURONIC, or TERGITOL surfactant, present between about 0.1 and 3 wt %. The cosolvent is 2-pyrrolidone, present in an amount between about 10 and 15 wt %. The modified pigment is MMC, present in an amount between about 3 and 10 wt %. The balance is water. The ingredients are combined and stirred mechanically or mixed using low power sonication. It is well-known that either method of mixing forms stable microemulsions.

A most preferred composition comprises about 5 wt % of a TERGITOL, about 3 wt % of EPH, about 12 wt % 2-pyrrolidone, about 5 wt % of a MMC, and the balance water.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

INDUSTRIAL APPLICABILITY

The ink compositions of the invention are expected to find use in thermal ink-jet inks, especially where improved ink characteristics, such as high edge acuity, high optical density, fast drying time, waterfastness, and smearfastness, are desired.

Thus, there has been disclosed a thermal ink-jet ink for thermal ink-jet printing comprising a microemulsion of a vehicle, a water-soluble colorant, and water. It will be apparent to those skilled in this art that various changes and modifications of an obvious nature may be made; all such changes and modifications are considered to fall within the scope of this invention.

What is claimed is:

1. A thermal ink-jet ink for thermal ink-jet printing comprising:
   (a) a vehicle comprising (1) about 0.1 to 50 wt % of at least one substantially water-insoluble organic oil, (2) 0 to about 50 wt % of at least one organic cosolvent, (3) 0 to about 40 wt % of at least one amphiphile, and (4) 0 to about 3 wt % of at least one high molecular weight colloid;
   (b) about 0.5 to 20 wt % of at least one macromolecular chromophore comprising a chemically-modified, water-soluble pigment; and
   (c) the balance water, wherein said ink exists as a microemulsion of said components, said microemulsion comprising a swelled micellar phase and a bulk water-rich phase, and wherein said macromolecular chromophore is dissolved in said bulk water-rich phase.

2. The ink-jet ink of claim 1, wherein said organic oil comprises at least one compound selected from the group consisting of glycol ethers, phenyl ethers, poly(glycol) ethers, alkyl ethers, aryl ethers, alkylaryl ethers, alkyl esters, aryl esters, poly(glycol) esters, alkyl phenyl polyethylene oxides, alkyl polyethylene oxides, water-insoluble acetylenic polyethylene oxides, polyethylene oxide block copolymers, polyethylene oxide esters, polyethylene oxide diesters, polyethylene oxide amines, polyethylene oxide amides, and dimethicone copolyols.

3. The ink-jet ink of claim 2, wherein said organic oil is selected from the group consisting of ethylene glycol phenyl ether and propylene glycol phenyl ether.

4. The ink-jet ink of claim 1, wherein said organic cosolvent comprises at least one compound selected from the group consisting of aliphatic alcohols, aromatic alcohols, diols, glycol ethers, poly(glycol) ethers, caprolactams, formamides, acetamides, and long chain alcohols.

5. The ink-jet ink of claim 4, wherein said organic cosolvent contains at least one compound selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides.

6. The ink-jet ink of claim 1, wherein said pigment is selected from the group consisting of black, cyan, yellow, and magenta pigments.

7. The ink-jet ink of claim 1, wherein said colorant is anionic and is associated with a counterion selected from the group consisting of alkali metal ions, alkaline earth metal ions, substituted ammonium ions, and unsubstituted ammonium ions.

8. The ink-jet ink of claim 1, wherein said colorant is cationic and is associated with a counterion selected from the group consisting of halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, perchlorate, tungstate, molybdate, and silicate ions.

9. The ink-jet ink of claim 1, wherein said amphiphile is selected from the group consisting of ionic surfactants, non-ionic surfactants, ionic amphiphiles, and non-ionic amphiphiles.

10. The ink-jet ink of claim 9, wherein said amphiphile is selected from the group consisting of alkyl phenyl polyethylene oxides, acetylenic polyethylene oxide surfactants, polyethylene oxide block copolymers, alkyl polyethylene oxides, polyethylene oxide esters, polyethylene oxide diesters, polyethylene oxide amines, protonated polyethylene oxide amines, polyethylene oxide amides, dimethicone copolyols, and substituted amine oxides.

11. The ink-jet ink of claim 1, wherein said high molecular weight colloid is selected from the group consisting of alginic acid salts and derivatives thereof, mannuronic acid and derivatives thereof, carageenan and derivatives thereof, guar gum and derivatives thereof, xanthan gum and derivatives thereof, dextran and derivatives thereof, chitin and derivatives thereof, chitosan and derivatives thereof, carboxymethylcellulose and derivatives thereof, and nitromethylcellulose and derivatives thereof.

12. The ink-jet ink of claim 1, wherein the concentration of said at least one substantially water-insoluble organic oil is less than about 5 wt %, said oil selected from the group consisting of ethylene glycol phenyl ether and propylene glycol phenyl ether; wherein the concentration of said at least one organic cosolvent is about 10 to 15 wt %, said cosolvent consisting essentially of 2-pyrrolidone; the concentration of said at least one amphiphile is about 0.1 to 3 wt %, said amphiphile selected from the group consisting of alkyl polyethylene oxide or polyethylene oxide block copolymers; the concentration of said at least one colorant is about 3 to 10 wt % and said colorant is a macromolecular chromophore; and the balance is water, and wherein said ink exists as a microemulsion of said components.

13. The ink-jet ink of claim 12, wherein the concentration of said at least one substantially water-insoluble organic oil is about 3 wt % and said oil is ethylene glycol phenyl ether; wherein the concentration of said at least one organic cosolvent is about 12 wt % and said cosolvent is 2-pyrrolidone; wherein the concentration of said at least one amphiphile is about 5 wt % and said amphiphile consists essentially of a polyethylene oxide; wherein the concentration of said at least one colorant is about 5 wt % and said colorant is a macromolecular chromophore; and the balance is water, and wherein said ink exists as a microemulsion of said components.

14. A method of ink-jet printing comprising printing on a medium with an ink-jet ink having the following composition:

(a) a vehicle comprising (1) about 0.1 to 50 wt % of at least one substantially water-insoluble organic oil, (2) 0 to about 50 wt % of at least one organic cosolvent, (3) 0 to about 40 wt % of at least one amphiphile, and (4) 0 to about 3 wt % of at least one high molecular weight colloid;

(b) about 0.5 to 20 wt % of at least one macromolecular chromophore comprising a chemically-modified, water-soluble pigment; and (c) the balance water, wherein said ink exists as a microemulsion of said components, said microemulsion comprising a swelled micellar phase and a bulk water-rich phase, and wherein said macromolecular chromophore is dissolved in said bulk water-rich phase.

15. The method of claim 14, wherein said organic oil comprises at least one compound selected from the group consisting of glycol ethers, phenyl ethers, poly(glycol) ethers, alkyl ethers, aryl ethers, alkylaryl ethers, alkyl esters, aryl esters, poly(glycol) esters, alkyl phenyl polyethylene oxides, alkyl polyethylene oxides, water-ilsoluble acetylenic polyethylene oxides, polyethylene oxide block copolymers, polyethylene oxide esters, polyethylene oxide diesters, polyethylene oxide amines, polyethylene oxide amides, and dimethicone copolyols.

16. The method of claim 14, wherein said organic cosolvent comprises at least one compound selected from the group consisting of aliphatic alcohols, aromatic alcohols, diols, glycol ethers, poly(glycol) ethers, caprolactams, formamides, acetamides, and long chain alcohols.

17. The method of claim 14, wherein said pigment is selected from the group consisting of black, cyan, yellow, and magenta pigments.

18. The method of claim 14, wherein said amphiphile is selected from the group consisting of ionic surfactants, non-ionic surfactants, ionic amphiphiles, and non-ionic amphiphiles.

19. The method of claim 14, wherein said high molecular weight colloid is selected from the group consisting of alginic acid salts and derivatives thereof, mannomuronic acid and derivatives thereof, carageenan and derivatives thereof, guar gum and derivatives thereof, xanthan gum and derivatives thereof, dextran and derivatives thereof, chitin and derivatives thereof, chitosan and derivatives thereof, carboxymethylcellulose and derivatives thereof, and nitromethylcellulose and derivatives thereof.

20. The method of claim 14, wherein the concentration of said at least one substantially water-insoluble organic oil is less than about 5 wt %, said oil selected from the group consisting of ethylene glycol phenyl ether and propylene glycol phenyl ether; wherein the concentration of said at least one organic cosolvent is about 10 to 15 wt %, said cosolvent consisting essentially of 2-pyrrolidone; the concentration of said at least one amphiphile is about 0.1 to 3 wt %, said amphiphile selected from the group consisting of alkyl polyethylene oxide or polyethylene oxide block copolymers; the concentration of said at least one colorant is about 3 to 10 wt % and said colorant is a macromolecular chromophore; and the balance is water, and wherein said ink exists as a microemulsion of said components.

21. A method for formulating microemulsion water-soluble inks for ink-jet printing comprising:
  (a) combining water, at least one amphiphile, an oil, a macromolecular chromophore comprising a chemically-modified water-soluble pigment and, optionally, at least one cosolvent and at least one high molecular weight colloid to form a stable solution;
  (b) mechanically stirring or sonicating said mixture to form said microemulsion ink, said microemulsion comprising a swelled micellar phase and a bulk water-rich phase, and wherein said macromolecular chromophore is dissolved in said bulk water-rich phase.

22. The method of claim 21 wherein said emulsion ink is formulated to have the following composition:
  (a) about 0.1 to 50 wt % of said oil;
  (b) a maximum of about 40 wt % of said amphiphile;
  (c) 0 to about 50 wt % of said cosolvent;
  (d) 0.05 to 3 wt % of said high molecular weight colloid;
  (e) about 0.5 to 20 wt % of said pigment; and
  (f) the balance water.

23. The method of claim 22 wherein said emulsion ink is formulated to have the following composition:
  (a) less than about 5 wt % of said oil, said oil selected from the group consisting of ethylene glycol phenyl ether and propylene glycol phenyl ether;
  (b) about 0.1 to 3 wt % of said amphiphile, said amphiphile selected from the group consisting of a polyethylene oxide or a polyethylene oxide block copolymer;
  (c) about 10 to 15 wt % of said cosolvent, said cosolvent consisting essentially of 2-pyrrolidone;
  (d) about 3 to 10 wt % of said pigment, said pigment consisting essentially of a macromolecular chromophore; and
  (e) the balance water.

24. The method of claim 23 wherein said emulsion ink is formulated to have the following composition:
  (a) about 3 wt % of said oil, said oil consisting essentially of ethylene glycol phenyl ether;
  (b) about 5 wt % of said amphiphile, said amphiphile consisting essentially of a polyethylene oxide;
  (c) about 12 wt % of said 2-pyrrolidone,
  (d) about 5 wt % of said macromolecular chromophore; and
  (e) the balance water.

* * * * *